Oct. 31, 1939.  S. K. WELLMAN  2,178,527
COMPOSITE MACHINE ELEMENT AND METHOD OF MAKING SAME
Filed May 28, 1938   6 Sheets-Sheet 3
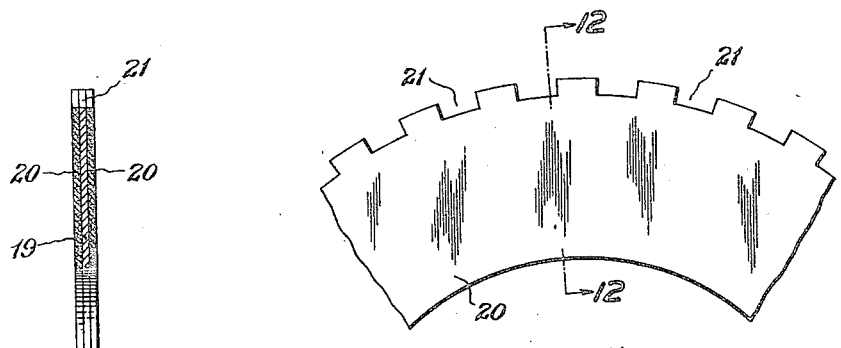
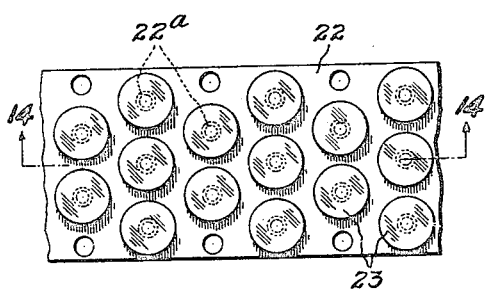
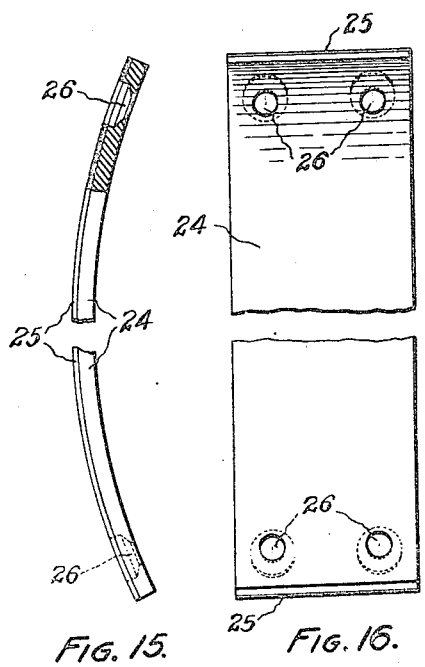
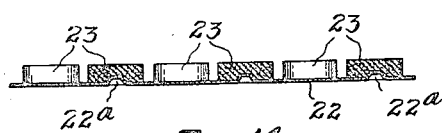
INVENTOR:
Samuel K. Wellman
BY Ray S. Uhr
ATTORNEY

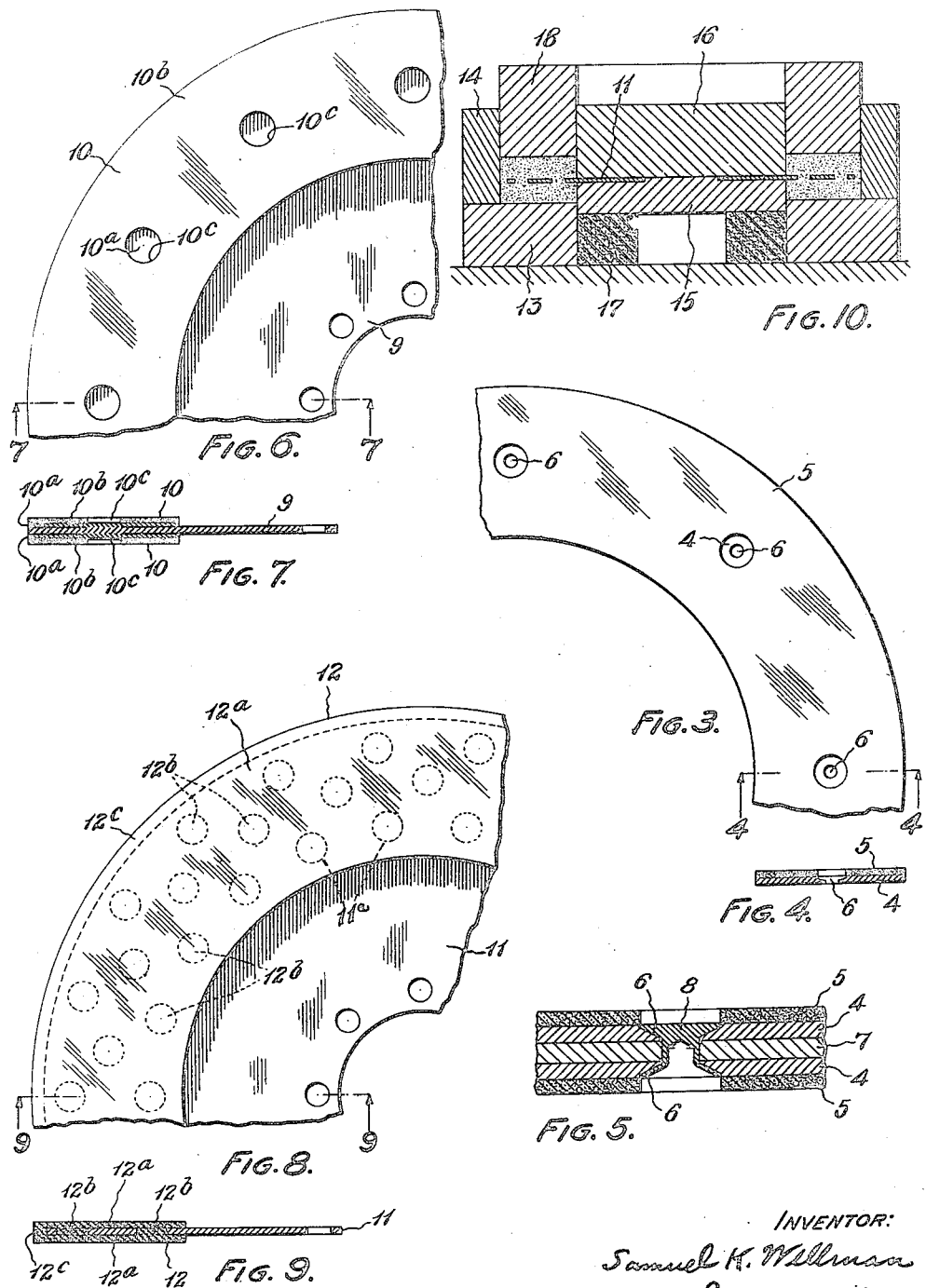

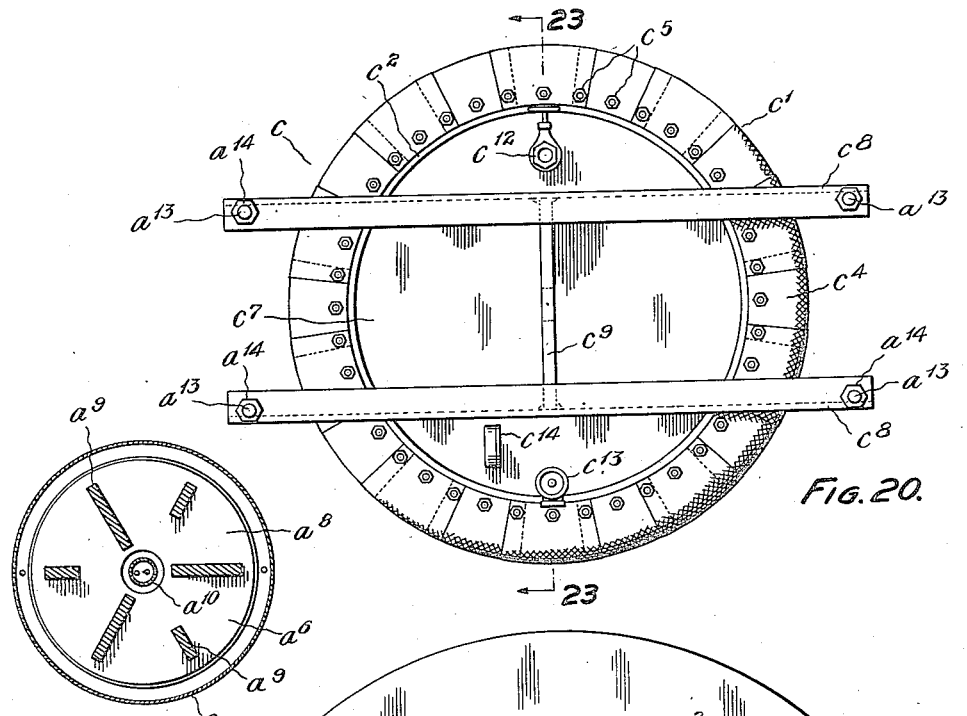
FIG. 20.
FIG. 22.
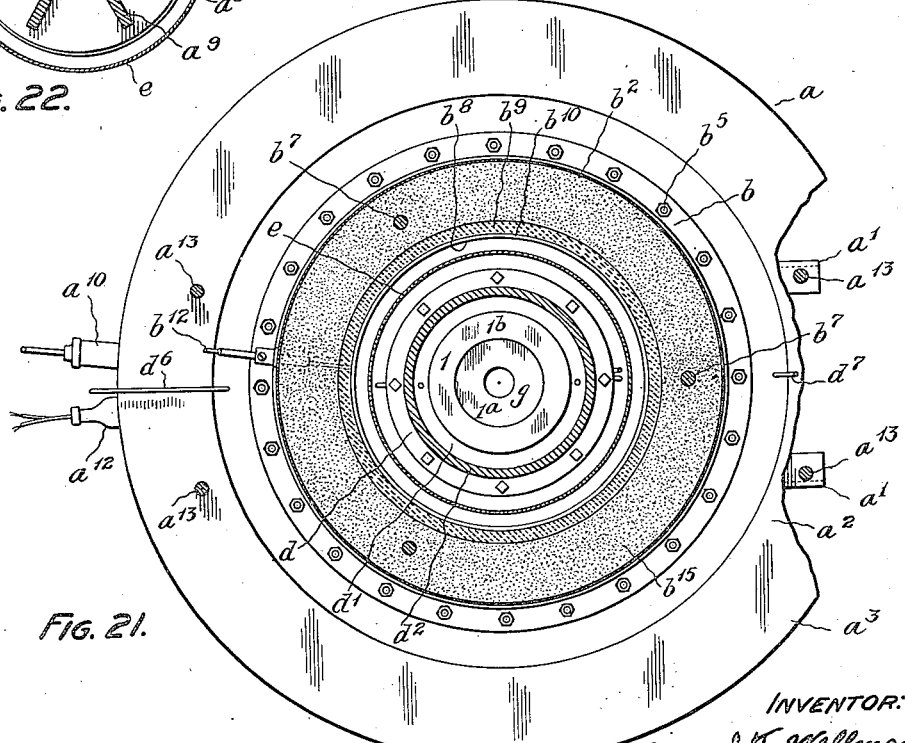
FIG. 21.

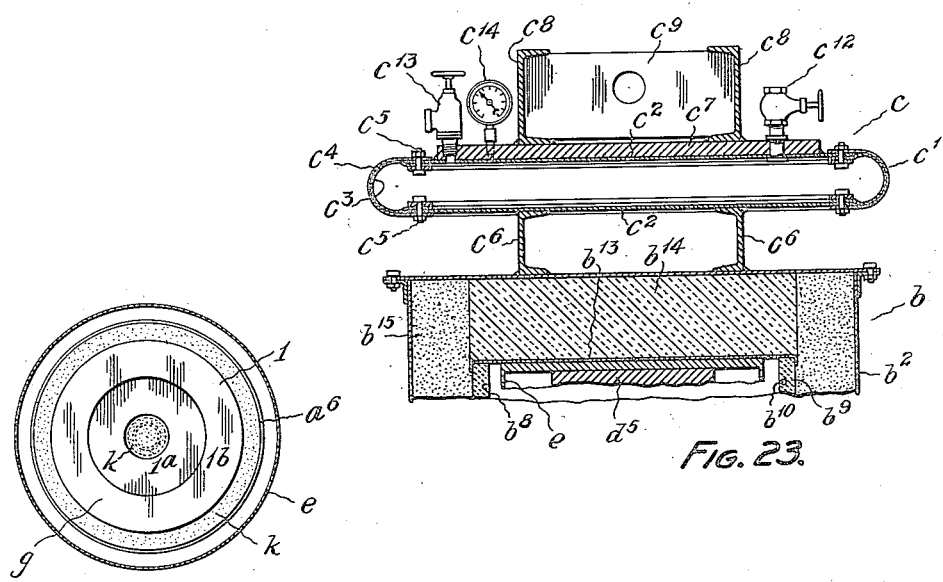
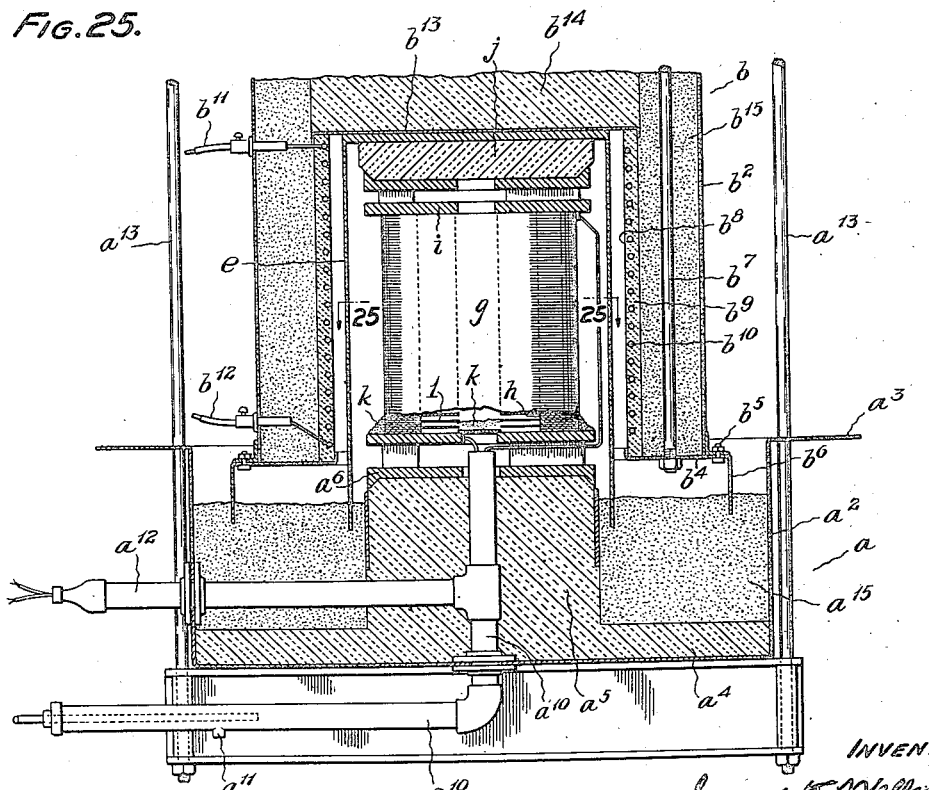

Patented Oct. 31, 1939

2,178,527

UNITED STATES PATENT OFFICE 2,178,527

COMPOSITE MACHINE ELEMENT AND METHOD OF MAKING SAME

Samuel K. Wellman, Cleveland Heights, Ohio, assignor to The S. K. Wellman Company, Cleveland, Ohio, a corporation of Ohio Application May 28, 1938, Serial No. 210,651

11 Claims. (Cl. 75—22)

This invention relates to improved composite machine elements and particularly such elements of friction clutches, friction brakes, bearings and other devices in which one element slidably engages another element or body, and further relates to improved methods for making such elements.

There have been proposals to form friction bodies for friction clutches and brakes and bearing members of various forms by compressing and sintering a powdered mixture of metals and, usually, some non-metallic material, to produce condensed coherent bodies for the respective uses indicated. In this way it is possible to produce friction bodies and bearing bodies predominantly metallic and having the non-metallic material, graphite for example, evenly distributed through the metal, and by suitably controlling the composition with respect to the metal constituents and the graphite or other non-metallic material, it is possible to produce bodies having remarkable and highly desirable friction or bearing characteristics. Most of the prior proposals known to me contemplated mounting the bodies of compressed powdered material on suitable supporting or backing structures to which the bodies were secured either mechanically or by interposition of some low-melting-point metal adapted when the structure was heated to form an alloy bond between the body of condensed powder and the supporting or backing member. It has also been proposed to weld the body of condensed powder directly to the backing member, but as far as I am aware no successful method of making such a weld has been available prior to my invention. None of the prior proposals, as far as I am aware, have worked out satisfactorily because the bodies of condensed powder, even when formed under extremely high pressure and effectively sintered by suitable heat treatment, are relatively low in mechanical strength and elasticity and none of the prior methods of attaching such bodies to supporting structures are adapted to impart to the body or structure of condensed powder sufficient strength to enable the resulting composite structure successfully to withstand the heavy stresses and high temperatures of severe service.

One of the objects of my invention is to produce a composite metallic element or body which has the advantages and desirable characteristics of the compressed powdered materials referred to and which at the same time is adequately strong and capable of successfully meeting very severe service conditions such, for example, as are found in friction clutch and brake apparatus.

A further and more specific object of the invention is to provide a clutch or brake disk having the desirable friction characteristics of compressed powdered friction material such as referred to above and which is relatively thin and light yet possessed of adequate strength and sturdiness.

Another object of the invention is to provide a brake or clutch friction block having a friction facing formed of compressed powdered friction material such as referred to above and which is exceedingly strong and sturdy and capable of withstanding the most severe service.

A further object of the invention is to provide a composite friction facing for disk clutches having the desirable friction characteristics of compressed powdered friction material such as referred to and which can readily be attached to the conventional clutch disks in place of other friction facing material and which possesses great strength and ruggedness.

Another object of my invention is to provide a flexible metallic friction body which has the friction characteristics of the compressed powdered friction material such as referred to and which is at the same time adequately strong and rugged.

Another object of the invention is to provide a method by which my improved composite elements of various forms can successfully be produced.

Other objects more or less incidental or ancillary to those above noted will appear in the following description.

In carrying out my invention I provide a novel composite machine element comprising a backing member of strong metal, preferably steel, and a working facing formed of compressed powdered material of the character referred to above and composed at least predominantly of metal of relatively high melting point, such as copper or iron, with the facing directly welded to the strong backing member in such a manner that the facing structure acquires to a very large extent the strength of the backing member. A structure of this character has been made feasible by my discovery of a practical method of effecting a very strong welded union between such compressed powdered material and the backing member.

Friction clutches and brakes present, perhaps, the most severe service conditions to which such composite machine elements may be subjected and, in further explaining my invention, I shall now describe, in connection with the accompanying drawings, several forms of clutch and brake devices embodying my improvements and, in order that such devices may be successfully produced by others, shall point out my preferred methods of making said devices.

In the accompanying drawings, Fig. 1 is a side elevation of a clutch disk and hub embodying the invention in one of its forms.

Fig. 3 is a fragmentary side elevation showing a portion of a composite friction facing suitable for disk clutches or brakes.

Fig. 4 is a section on the line 4—4 of Fig. 3.

Fig. 5 is an enlarged fragmentary section showing the manner in which friction facings, such as shown in Figs. 3 and 4, may be attached to a clutch disk.

Fig. 6 is a fragmentary side elevation showing a portion of a clutch disk with composite friction facings attached to the disk by welding.

Fig. 7 is a section on the line 7—7 showing the manner in which the strong metal backing plate of the composite friction facing is welded to the clutch disk.

Fig. 8 is a fragmentary side elevation of a clutch disk embodying my invention in still another form.

Fig. 9 is a section on the line 9—9 of Fig. 8.

Fig. 10 is a vertical sectional view of a die or mold suitable for forming the type of clutch disk shown in Figs. 8 and 9.

Fig. 11 is a fragmentary side elevation of a composite friction ring made in accordance with my invention and suitable for use in friction clutches of the ring type.

Fig. 12 is a section on the line 12—12 of Fig. 11.

Fig. 13 is a fragmentary side elevation or face view showing a portion of a flexible composite friction body suitable for use as a brake lining.

Fig. 14 is a section on the line 14—14 of Fig. 13.

Figs. 15 and 16 show, respectively, face and side elevations of a brake block embodying the invention, a portion of the structure being broken away to permit illustration on a larger scale.

Fig. 20 is a plan view of the upper part of the furnace shown in Fig. 17.

Fig. 21 is a horizontal sectional view on the line 21—21 of Fig. 17.

Fig. 22 is a horizontal section on the line 22—22 of Fig. 17.

Fig. 23 is a sectional view of the upper part of the furnace shown in Fig. 17, the section being taken on the line 23—23 of Fig. 20.

Fig. 24 is a central vertical sectional view of the furnace shown in Fig. 17 with some of its interior fittings modified for the carrying out of a modified form of method of producing composite machine elements.

Fig. 25 is a horizontal sectional view taken on the line 25—25 of Fig. 24.

Figure 1:
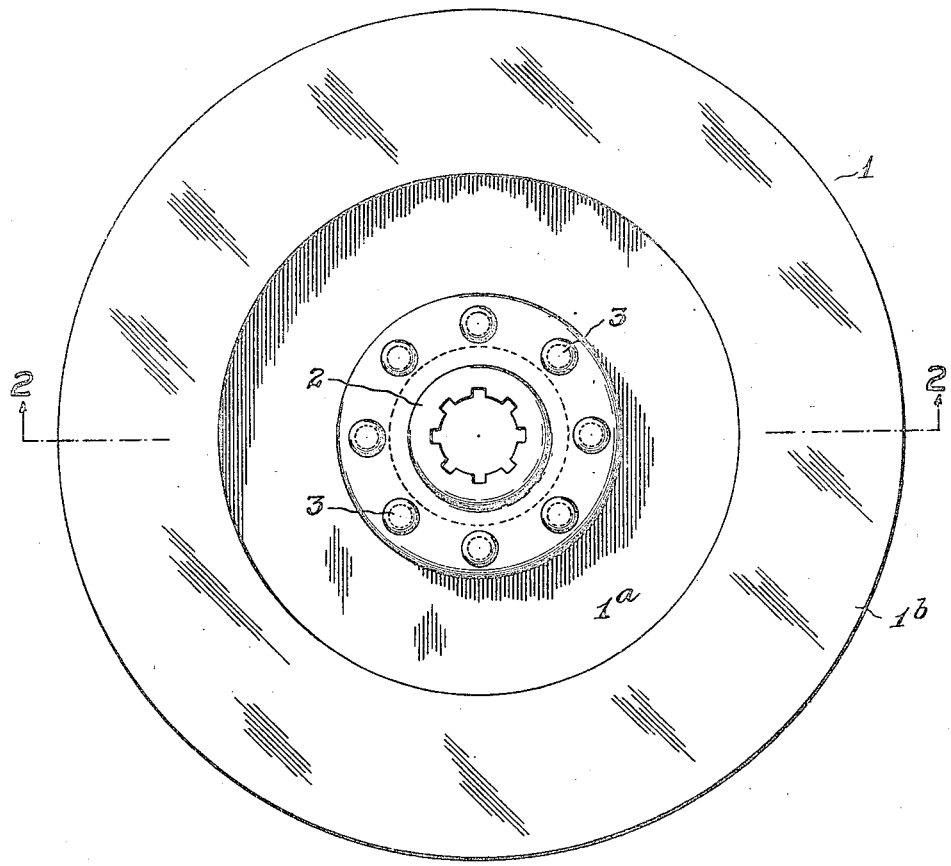
Figure 2:
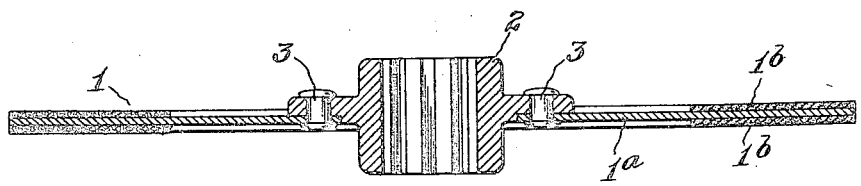
Fig. 2 is a section on the line 2—2 of Fig. 1.

Referring in detail to the clutch disk shown in Figs. 1 and 2 and the method of making the same, I designates as an entirety the clutch disk which is secured to a hub 2 of the usual construction by rivets 3, 3. The disk I comprises the disk proper 1a which is preferably formed of sheet steel and two facing rings 1b, 1b which are formed of highly compressed and coherent powdered friction material of the character previously referred to. For the purpose of my invention the powdered friction material should consist predominantly of high melting point metal such as copper or iron and preferably should comprise one or more additional metals with or without some solid, non-metallic material adapted to decrease or increase the coefficient of friction of the resulting mixture. Graphite is an example of such non-metallic materials. So long as the powdered material consists predominantly of metal such as copper or iron in its composition as to the other constituents may be varied considerably to secure the frictional or anti-frictional properties suitable for the specific use to which the product is to be put. For clutch and brake disks suitable for many uses I have found a satisfactory composition to be 73% copper, 14% lead, 7% tin and 6% graphite. For friction clutches I have also used satisfactorily a composition consisting of 70.9% copper, 10.9% lead, 6.3% tin, 7.4% graphite and 4.5% air floated silica; also a composition consisting of 62% copper, 8% iron, 12% lead, 7% tin, 7% graphite and 4% silica. For use in bearings a variety of specific compositions may be used. One composition suitable for such use consists of 79% copper, 9% lead, 2% nickel and 10% graphite.

The friction facing rings 1b, 1b are directly welded by a strong and effective union to the disk 1a. I shall now describe the way in which the rings 1b are formed and preferred methods of welding them to the disk 1a.

The powdered material can be prepared in various ways. However, when copper is the predominant constituent I prefer to employ powdered copper that is formed by electrolytic deposition. Powdered copper formed by the reduction of finely divided copper oxide and that formed by mechanical powdering or disintegration may also be employed, but the electrolytically deposited copper has the advantage that the particles are dentritic in form and consequently, when highly compressed, appear to make a stronger structure than does powdered copper formed by methods producing a more compact particle form. Iron powder suitable for the practice of my invention may be prepared by the reduction of finely divided magnetic iron oxide.

To product the friction ring 1b, a suitable amount of well mixed powdered material of the desired composition is introduced into a die having a suitable annular cavity and is uniformly distributed therein. A suitable steel follower plate is then lowered upon the charge of powdered material, the die is placed upon the bed of a suitable press and the plunger of the press is moved to compress the powdered material to the desired density and dimensions. The pressure to which the powdered material is subjected may vary over a wide range but it is desirable to use a high pressure as the strength of the ring produced increases with the pressure. For reasons hereinafter noted I prefer to make use of pressures of about 22,000 pounds per square inch. In commercial production it is desirable that the die be made of sufficient depth so that a series of charges of powder, separated by follower rings, can be introduced and several of the compressed rings formed simultaneously.

When the compressed rings of powdered friction material are removed from the die, they have the general appearance of a rolled or forged metal ring. Nevertheless they have a fine porous structure, are brittle and rather easily fractured. To give the rings added strength they are next heat treated by subjecting them, preferably in a reducing atmosphere, to a temperature of from 1250° F. to 1450° F. or even higher, depending upon the percentage of iron, if any, included in the composition. This heat treatment is continued for a sufficient length of time to secure the desired result, namely, the effective sintering of the material without substantially reducing its porosity. I have found a treatment of about 30 minutes at 1350° F. satisfactory for this purpose when copper constitutes the high-melting-point metal of the composition. However, lower temperatures than those mentioned may be employed if the heat treatment is sufficiently prolonged. It is noted in this connection that, depending upon the pressure at which the ring is formed, it may either expand or contract during the heat treatment. If the forming pressure is above a certain point the resulting friction material will permanently expand or grow during heat treatment. On the other hand, if the forming pressure is below this same point contraction occurs during the heat treatment. I have chosen the above noted pressure of 22,000 pounds per square inch with a view to avoiding as far as possible permanent contraction of the compressed member during, or as a result of, the heat treatment to which it is subjected during either manufacture or subsequent use, without incurring the difficulties incident to the use of the high pressures indicated as necessary entirely to obviate either expansion or contraction. It will be understood that this is a feature of some importance since structures such as clutches, brakes and even bearings may be subjected to considerable heating in service which might result in distortion of the structure if suitable precautions of one kind or another are not taken.

For the reducing atmosphere preferably employed during the heat treatment use is preferably made of carbon monoxide or hydrogen. I have found it convenient to generate carbon monoxide by introducing charcoal into the chamber of the heat treating furnace.

Following the heat treatment of the ring I prefer to size it by pressing it between flat surfaces in a hydraulic press. This straightens the ring and leaves a smooth flat surface on either side of it. The straightened ring is next subjected on one side or face to a mechanical cleaning operation which I prefer to carry out by a sort of grinding or buffing action. This can be done by allowing the ring to rest upon a rotating surface of sand paper or the like. One of the principal reasons for this cleaning operation is to remove free graphite which generally is present upon the surface of the condensed friction material after it has been formed and heat treated. The grinding action referred to removes such free graphite and perhaps has a sort of buffing effect tending to form on the friction ring a continuous metallic surface free from graphite.

The clutch disk 1a should have its surfaces to which the friction facings are to be attached properly cleaned. Such disks are stamped from sheet steel or other suitable metal and usually come from the stamping press with considerable oil or grease or their surfaces. To remove all of this oil and grease the disk may be dipped in a hot caustic bath, then in an acid bath to neutralize the caustic, then rinsed in water to remove acid, and then rapidly dried, preferably with absorbent material such as warm, clean sawdust. While it is not necessary to further treat the steel backing disk, I have in some cases found it advantageous to polish or grind the disk surfaces to which the facings are to be welded so that the surface is bright and thoroughly free from any impurities.

The two friction facings and the clutch disk are next assembled with the prepared surfaces of the parts in mutual contact. This assembly is then placed in a furnace with a sufficient weight or pressure upon it to maintain firm contact between the disk and facing rings throughout their opposite surfaces. The furnace and disk assembly therein are heated to a suitable welding temperature and then allowed to cool, a reducing atmosphere, such as referred to above, and non-corroding or non-oxidizing conditions, as hereinafter explained, being meanwhile maintained in the furnace to insure that the metals of the facing and backing members, and especially the latter, are not oxidized. The temperature to which the furnace is heated should be such as to soften the material of the facings to a sufficient degree to effect the union or welding of the facings to the disk 1a. The temperature should not be high enough to affect distribution or cause rearrangement of the constituents of the facings, as would occur if the predominant metal of the facing were fused. When fusion of the predominant metal of the facing is avoided the welded joint in cross section presents a distinct line of demarcation between the backing and facing members, and the absence of such distinct line may be taken as an indication that an unnecessarily and undesirably high welding temperature has been used. Suitable temperatures will vary somewhat with the composition of the facing material. For the specific compositions given above I have found temperatures of 1350° F. to 1500° F. suitable. The entire welding treatment, as I have successfully carried it out in this manner, consumes several hours.

In practice it is desirable to treat a number of the disk assemblies simultaneously and this can be done by piling the assemblies one upon the other in the furnace, using care that the facing rings of separate assemblies are so separated as to keep them from sticking together. This can conveniently be done by covering the upper surface of the top facing ring of each assembly with powdered graphite. A sheet of mica or other suitable material might be substituted for the graphite with similar effect. A suitable weight or pressure is, of course, applied to the top of the pile of elements in order to insure the firm contact between the facing and backing elements above referred to.

Instead of sintering the friction facing in one operation and welding it to the backing member in a separate operation, it is possible, and in many cases preferable, to effect both sintering and welding in one heating operation. In carrying out this latter procedure, the clutch disk or other backing plates, properly prepared by cleaning as above described, are assembled with the compressed but unsintered facing plates and one or more such assemblies with suitable separators between assemblies are introduced into the welding furnace and subjected to a suitable weight or pressure, as in the first described procedure. Then, with a reducing atmosphere and with non-corroding or non-oxidizing conditions as hereinafter explained, the furnace is brought up to the welding temperature of 1350° F. to 1500° F. and allowed to cool.

To secure a satisfactory welded union between the steel disk and the facing rings it is important that non-corroding or non-oxidizing conditions be carefully maintained during the welding operation to avoid the formation of metallic salts or oxides, and especially iron salts or oxides, at the junction between the facing and backing members. To this end it is desirable to protect the clean surfaces of the facing and backing members from corrosive or oxidizing action both before they are brought together in the welding chamber and while they are in contact during the welding operation. As far as I am aware, prior to the present invention, there has been no successful way of accomplishing this result. This is due, I believe, to the failure of prior workers to appreciate the significance of the fact that the powdered material of which the facing members are formed and the facing members themselves, because of their porous character, tend to absorb, and probably adsorb, moisture and air. I have definitely established experimentally that porous facing members such as are herein described, if formed in a humid atmosphere, or exposed to such an atmosphere after being formed, will absorb or adsorb within their pores substantial amounts of moisture from the air. If such a porous member, holding moisture within its pores though externally dry, is clamped against a ferrous backing plate and the assembly heated to weld the two members together, the contained moisture of the porous facing is driven out by the heat (doubtless in the form of steam) and into direct contact with the adjacent surface of the ferrous backing member, thus subjecting the latter to a powerful oxidizing or corroding action. Accordingly, in the practice of the present invention, I take precaution to prevent this action. This, I have found, can be accomplished in several different ways.

Thus the powdered constituents of the facing members and the finished facing members especially may be effectively protected from moisture prior to the consummation of the weld. A suitable procedure to this end is to carry out both the fabricating of the porous facing members from suitably dry and pure materials and the welding of said members to their ferrous backing members in a suitably air-conditioned room so that there is no opportunity for the powdered material or the porous facing members to absorb or adsorb moisture in substantial amount or, in other words, to an extent sufficient to produce an oxidizing effect upon the ferrous backing plate during the welding operation. A relative humidity below 40 per cent will ordinarily secure this result. Under some conditions, as in the case of excessive general atmospheric humidity, it may be desirable as a precautionary measure to hold fabricated facing members in a dry reducing atmosphere until they are about to be welded.

Should it be desirable to utilize porous facing members which may have been fabricated from materials insufficiently dry or pure or which may inadvertently or incidentally have been exposed to moisture, this may be done by heating the members in a vacuum or a suitable reducing atmosphere for suitable periods at sufficiently high temperatures to overcome the force of adsorption and permit expulsion of the moisture. Ordinarily, heating the porous members up to 750° F. is sufficient to expel all iron-corroding vapors and gases sorbed in the pores of said members.

A procedure such as last referred to may advantageously be combined with the operation of welding the facing and backing members together. The apparatus shown in Figs. 17 to 23 of the drawings is especially adapted for such combined procedure and the use of such apparatus and procedure makes it unnecessary to carry out the fabrication and welding of the facing members in an air-conditioned space.

The furnace, as shown in Figs. 17 to 23, comprises a base structure designated as an entirety by the letter $a$ and a top or cover structure designated as an entirety by the letter $b$. The base structure comprises a pair of underlying channel members $a$—1, $a$—1 upon which is mounted and secured (as by welding) a sheet steel tub or pan $a$—2 with the top of its side wall flanged outward at $a$—3. The bottom of pan $a$—2 has a heat insulating lining $a$—4 which is formed with a central cylindrical upward extension $a$—5 designed to support the work in the furnace. Extension $a$—5 is covered by an iron casting $a$—6 which is cored out to form top and bottom plates $a$—7, $a$—8 connected by vertical webs $a$—9, thus providing passageways for the circulation of gases which may be introduced through pipe $a$—10. The horizontal branch of pipe $a$—10 is fitted with a downwardly opening nipple $a$—11, the purpose of which will later be explained. Branch pipe $a$—12 joined to the upright section of pipe $a$—10 serves as a conduit for thermocouple conductors, as will also later be explained.

The furnace cover structure $b$ comprises an inverted cup-shape casing structure of sheet steel which consists of a circular top plate $b$—1, a cylindrical side wall $b$—2 attached to the top wall $b$—1 by bolts $b$—3, and annular bottom wall $b$—4 secured to side wall $b$—2 by bolts $b$—5 and having a depending flange or skirt $b$—6. This casing structure is strengthened by a plurality of tie rods or bolts $b$—7 joining top plate $b$—1 and bottom plate $b$—4. The cover structure $b$ has its inner side wall formed by a tubular electric heating element $b$—8 which consists of a wall $b$—9 of refractory and heat insulating cement in which is embedded an electric heating coil $b$—10, the terminals of this coil being shown at $b$—11, $b$—12. The open top of heating element $b$—8 is closed by a sheet metal plate $b$—13 and the space between the latter and the top plate $b$—1 is filled with heat insulating material $b$—14. Also the space between side wall $b$—2 and heating element $b$—8 is filled with loose heat insulating material $b$—15.

For the purpose of applying downward pressure to the furnace cover, the latter is fitted with an air pressure device $c$ which consists of an air chamber $c$—1 formed by top and bottom circular steel plates $c$—2, $c$—2 joined at their peripheries by a flexible rubber wall $c$—3 which may conveniently be formed from the inner tube of a pneumatic tire and which is reinforced by strips $c$—4 of heavy canvass, the edges of the circular plates $c$—2, the rubber wall $c$—3 and the canvas strips being hermetically joined as by bolts $c$—5. The air chamber $c$—1 rests upon and is secured, as by welding, to a pair of steel channels $c$—5, $c$—6 which are in turn welded to the top of the furnace cover (Fig. 23). To the top of the air chamber is welded a circular reinforcing plate $c$—7 on which in turn is welded a pair of channel members $c$—8. An apertured plate $c$—9 joins channels c—8 and a hoist may be attached to this plate c—9 to lift the furnace cover.

The base structure of the furnace carries a number of upstanding tie bolts or rods a—13 which slidably engage guides c—10 carried by channel members c—6 and guides c—11 carried by channels c—8. Thus, when the nuts a—14 of tie rods a—13 are screwed down on channels c—8 a top abutment is afforded for the air chamber c—1, enabling said chamber when inflated to subject the top of the furnace to downward pressure. The top plate of air chamber c—1 is provided with a valve-controlled air inlet c—12, also with an air relief valve c—13 and a pressure gauge c—14.

In the use of the furnace in carrying out the process or procedure last refered to, the work to be welded is enclosed within a tightly sealed inner metal chamber within the furnace. This inner sealed chamber is designated as an entirety by the letter d and comprises a metal base d—1, cylindrical side wall d—2 and a sheet metal top wall or diaphragm d—3. The side wall d—2 is tightly bolted to base d—1 and diaphragm d—3 is tightly secured to the side wall by a bolted ring d—4. A pressure block d—5 rests upon diaphragm d—3.

Figure 17:
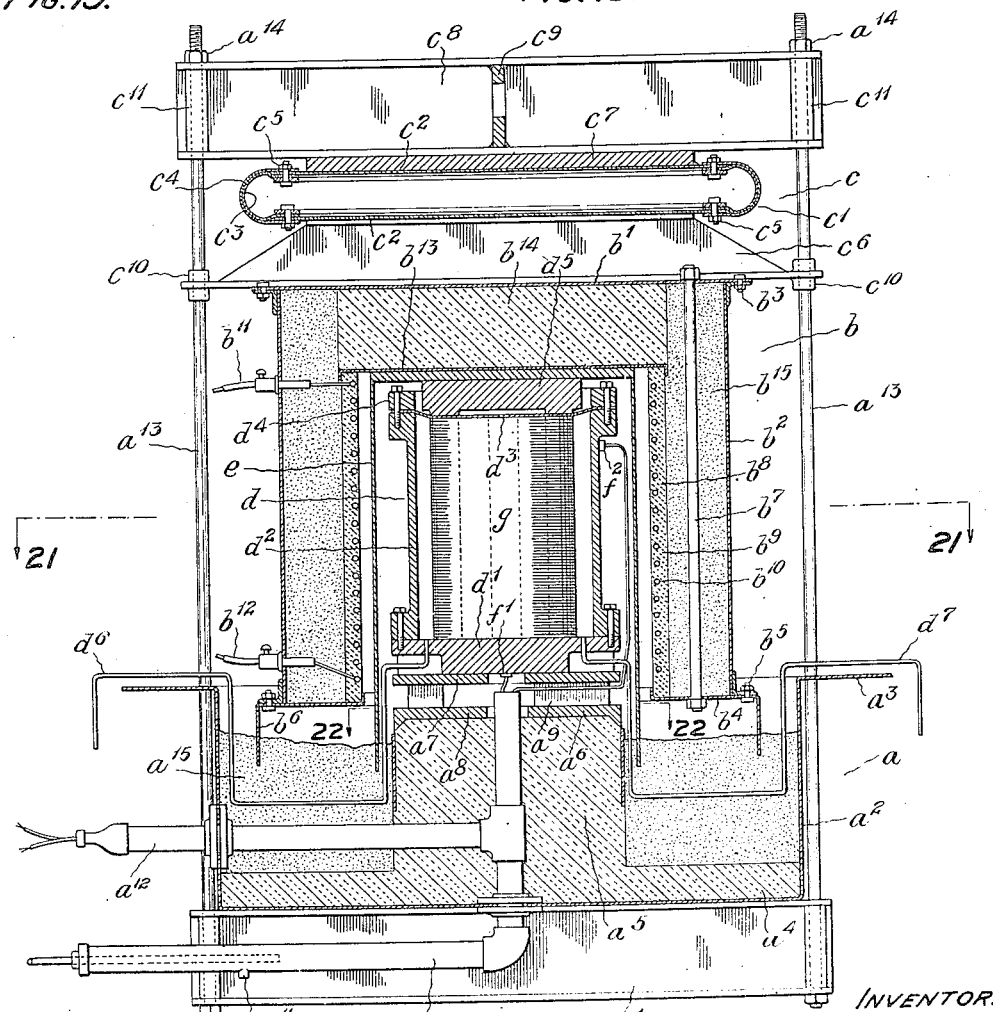
Fig. 17 is a vertical central sectional view of a sintering and welding furnace for carrying out one form of my improved method of producing composite machine elements.

In order to provide for the maintainance of a current of suitable reducing gas through the sealed chamber d, the base plate d—1 is fitted with an inlet tube d—6 and an outlet tube d—7, said tubes being bent as shown in Fig. 17 to pass under the side wall of the furnace cover.

The sealed chamber d is provided with a protecting air seal in the form of an inverted cup-shape cover e of sheet metal, the top wall of this cover being interposed between the block d—5 and the top portion of the furnace cover b.

With the parts of the furnace assembled as shown in Fig. 17, the depending skirt b—6 of the furnace cover and the lower end of the air seal cover e are embedded in loose heat insulating material a—15 in the furnace base so as to prevent free access of air to the interior of the furnace chambers. In Fig. 17 thermocouples are shown at f—1 and f—2 in contact with the base and side wall, respectively, of the sealed chamber d, the conductors for these thermocouples being carried to the exterior of the furnace through pipes a—10 and a—12.

Figure 19:
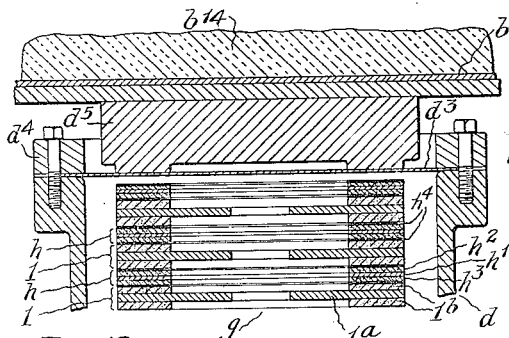
Fig. 19 is a view similar to Fig. 18 but showing the parts in their respective positions before pressure is applied to the work in the furnace.
Figure 18:
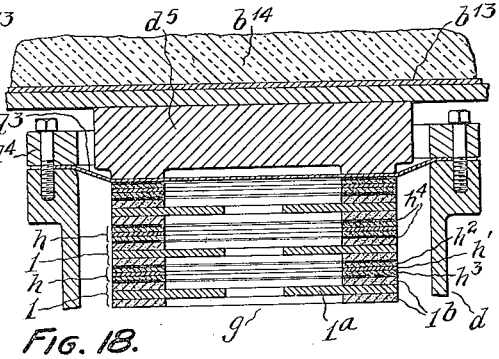
Fig. 18 is a fragmentary sectional view showing an enlarged portion of the structure shown in Fig. 17.

In the use of the furnace illustrated in Figs. 17 to 23, for the combined purposes of eliminating moisture or gases from the compressed powdered metal facings, sintering the said facings and welding them to steel backing members, the work to be treated and welded is placed in the sealed chamber d and in the drawings the work is shown at g as consisting of a stack of clutch discs such as that shown in Figs. 1 and 2 of the drawings together with suitably interposed separators h between the individual clutch disc assemblies, the separators serving to prevent the welding together of separate disks or assemblies. As shown in Figs. 18 and 19, each clutch disk assembly consists of one of the steel disks 1a and facings 1b, 1b on the two sides thereof, and each separator h consists of a similar steel disk h—1 to which compressed powdered metal facings h—2 and h—3 have previously been welded, together with a thin coating h—4 of graphite on the exposed face of each compressed powder part, the graphite in practice being sprayed in colloidal state upon the separator to form, when dried, a thin even coating. These separators are remarkably strong and their faces formed by the porous facing material can be ground to accurate parallelism so that the individual assemblies of the stack of work to be welded will be subjected to uniform pressure throughout their respective areas. Also, the porous character of the separate faces is adapted to give a very strong union between the facing material and the graphite coating, so that the separators as entireties are very durable. The facings 1b, 1b as assembled in the furnace may be either sintered or unsintered, but in the present description it is assumed that they are unsintered.

In the use of the furnace described, to carry out the procedure which has been referred to, with the top of the furnace and the air seal structure e removed the work to be welded is assembled in the chamber d and the latter closed by bolting on the top diaphragm d—3 thereof as shown in Fig. 19, a slight space preferably being left between the top of the stacked-up work and the diaphragm d—3. Next, the pressure block d—5 is applied, the air seal e is placed over the chamber d and the top of the furnace is lowered into position over the furnace base so that the skirt b—6 is embedded in the loose insulation a—15 but with the furnace top or cover supported by the hoist. Under these conditions the stack of work is not subjected to pressure, except for the moderate weight of the work itself.

As heating of the work in the furnace is started a supply of non-oxidizing gas, such as natural gas or the like, is admitted to pipe a—10, and a flame is applied to ignite such gas as escapes through the nipple a—11 of the pipe, the flame at this point serving to indicate to the operator that the combustible glas is entering that part of the furnace chamber between the sealed chamber d and the air protecting seal e and maintaining a sufficient pressure to prevent infiltration of air. At the same time that the flow of a gas is started through pipe a—10 a current of dry reducing gas, preferably hydrogen, is started flowing through inlet tube d—6 into the interior of the sealed chamber d and out from said chamber through tube d—7, outlet tube d—7 being controlled (by water seal, for example) so as to regulate the flow and maintain a superatmospheric pressure in chamber d.

The dry hydrogen thus introduced into chamber d diffuses therein, permeating the interstices between the assemblies of the stacked-up work, and serves, if its flow is sufficiently rapid, to absorb and carry out from the sealed chamber vapors and gases expelled from the pores of the facing material substantially as rapidly as they are expelled by the heat of the furnace. Accordingly, as the furnace is heated up to the welding temperature any moisture and gases driven out of the porous facing members is prevented from having corrosive action upon the surfaces of the ferrous backing members. As the temperature of the furnace is gradually increased and reaches a value of 1200° to 1300° F., sintering of the compressed powdered facings is effected. With further heating, the welding temperature lying in the range of 1350° to 1500° F. is reached, the hoist supporting the top of the furnace is eased off, nuts a—14 are applied to the tie rods a—13 and the pressure device c—1 is inflated to apply downward pressure to the furnace top b. This pressure causes the pressure block d—5 to force diaphragm d—3 downward, as shown in Figs. 17 and 18, against the stack of work and apply sufficient pressure thereto to insure firm contact between the compressed powdered facings and the clutch disks throughout the entire extent of their contiguous surfaces and thus effect the desired weld between the parts.

When the weld has been effected by the application of pressure as above described, the top of the furnace is lifted off and, with the protective air seal e remaining in position, the parts of the furnace, including the sealed chamber d, and the welded work are allowed to cool, the pressure of the hydrogen in the sealed chamber d and of the natural gas in the space surrounding the chamber d being meanwhile kept slightly above atmospheric pressure until the chamber d and the work therein have reached a sufficiently low temperature to prevent oxidation in contact with the air, whereupon the protective seal e can be removed and the chamber d further cooled to permit it to be opened for the removal of the work.

Usually the relatively thin steel disk or diaphragm d—5 is so distorted by the application of pressures to the furnace top that it is desirable to provide a fresh diaphragm for each operation of the furnace. Also, the protective seal e tends to deteriorate relatively rapidly because it is necessarily exposed to the air at high temperature. However, it is relatively inexpensive and its occasional renewal is not a serious matter.

By the use of the furnace with the inner sealed chamber d I have been enabled to demonstrate in a striking manner that moisture or oxidizing or corroding gases sorbed in the compressed powdered facings prevents successful welding of such facings to ferrous backing members. I have made such demonstration by modifying the foregoing procedure by the application of pressure to the stack of work in the furnace at the beginning of the heating operation and by maintaining an atmosphere of hydrogen in the sealed chamber around the work without maintaining a continuous current of the hydrogen through the chamber as described. When this latter procedure is followed with facings known to contain moisture it is impossible to secure good welds between the facings and the steel backing plates, whereas by the use of the first described procedure welds of extremely high quality are uniformly obtained with facings produced under identically the same conditions.

In the procedure first described above corrosion of the ferrous metal of the backing member during welding is prevented by fabricating and maintaining the facing under atmospheric conditions that avoid sorption of a substantial amount of iron-corroding gases or vapors, whereas in the other procedures described above such corrosion is prevented by heating the facing until it does not contain enough iron-corroding gases and vapors susceptible of being driven out of the welding operation to produce a significant corrosion of the backing member and by then maintaining the facing in a suitable atmosphere until the welding operation. Thus each of the said procedures through the use of a controlled atmosphere provides for the welding operation a porous facing that, for the purposes of this invention, may be said to be substantially free from iron-corroding gases or vapors sorbed therein.

Another way in which the ferrous backing member can be effectively protected from corroding or oxidizing action of moisture or gases sorbed in the facing and successful welding of the porous facing directly to the backing member be attained consists in applying to the cleaned surface of the backing member a film of a suitable material capable of protecting the backing member from the corroding or oxidizing action without interfering with the formation of a direct weld between the ferrous backing member and the predominant high-melting-point metal or metals of the facing member. Such a protecting film can be formed by the electric deposition of suitable metals on the backing member. A coating of copper is suitable where the predominant high-melting-point metal of the facing consists entirely of copper, while a coating of nickel is suitable where the predominant high-melting-point metal of the facing member includes a substantial percentage of iron powder. Such a coating of nickel is preferably applied over a thin plating of copper on the ferrous backing member, in accordance with usual nickel plating practice.

In the use of the protective metal coating, the assembled electroplated backing members and compressed facing members may be welded in a furnace of the type shown in Figs. 17 to 23, though with the use of the coated backing members the inner diaphragm chamber of the furnace becomes unnecessary. In Figs. 24 and 25 the furnace is shown with a charge therein of the asembled coated backing members and facing members, together with separators of the character already described.

With the omission of the sealed inner chamber d the stack of work to be welded is placed directly upon the base casting a—6 while a similar cored out casting i is placed upon the top of the stack of work and on casting i in turn is placed a block j of heat insulating refractory material to be engaged by the top of the air sealing structure e of the furnace.

The welding operation, or combined sintering and welding operation, is carried out as follows. With the furnace top removed, the work to be welded is placed upon the base casting a—6 of the furnace, charcoal is placed on the casting a—6 around the work as indicated at k, the protective structure e is placed over the work, the furnace top is lowered into position and the air pressure device inflated to apply sufficient pressure to the elements to be welded to insure their firm mutual contact. Thereupon heating of the furnace is started and as its temperature rises air initially in the furnace oxides the charcoal at k to form carbon monoxide which fills the furnace chamber. Meanwhile pipe a—10 can be opened to the supply of natural gas which, as in the last described procedure, prevents entrance of air into the furnace while it is cooling.

As the temperature of the furnace is raised any moisture or oxidizing or corroding gases sorbed in the compressed powdered facings will be driven out by the time the temperature has reached about 750° F. but the thin coating of copper or nickel on the ferrous backing members protects the latter from oxidizing or corroding action by these vapors or gases.

When the temperature of the furnace rises into the range of 1200° to 1300° F. sintering of the compressed powdered facing is effected and with further rise of the temperature within the range of 1350°–1500° F. the facings become welded to the steel clutch plates. Thereupon the furnace top is removed, the air seal e being meanwhile left in position until the work has had time to cool and the supply of reducing gas also being maintained through pipe a—10 meanwhile to prevent infiltration of air to the work while it is cooling.

It is not possible to state with certainty how the thin film or coating on the surface of the ferrous backing member functions in preventing oxidation and corrosion of the ferrous metal but it is my belief that oxidizing vapors and gases driven off from the porous facing in the hot furnace converts the film of protective metal, copper for example, into a film of copper oxide, the latter serving effectively to prevent oxidation of the ferrous metal beneath. Careful examination of the bond of the welded product discloses no trace either of the oxide or of the original protective film of metal. Apparently, during the later higher temperature stage of the welding operation either the film of oxide is absorbed and diffused into the porous facing or is reduced to the metallic state again as the reducing gas in the furnace chamber finds access to it and, in such state, absorbed and diffused into the porous facing. In any event, the thin protective metal coating on the backing plate effectively protects the latter against the oxidizing or corroding action of moisture or gases that may be sorbed in the compressed powder facing.

In each of the alternative methods of welding above described one expedient or another is employed to avoid oxidizing or corroding conditions with respect to the clean or prepared ferrous metal surface to which the compressed powdered facing is to be welded until such welding has been consummated. In each method this result is secured by preventing access to the ferrous surface to be welded of corroding moisture or gases that tend to be sorbed in the porous facing.

It may be observed further that in the last described procedure utilizing the protecting metal film on the backing member and also in the procedure in which the current of dry hydrogen is maintained between the facing and backing member during the first stage of the heating, the desired end is attained by providing a protecting stratum of material between the ferrous metal of the backing member and the juxtaposed facing.

It seems probable that moisture sorbed in the pores of the facing is, for the most part at least, taken up from the air, but it is to be observed that if any of the copper surfaces of the pore walls should become oxidized such oxide might react with hydrogen or light hydrocarbons present in the furnace atmosphere during the heating with resultant formation of water in the pores. However, no matter how the moisture gets into the pores of the facing it is effectively prevented from corroding the ferrous metal by one or another of the expedients which I have described.

By the methods above described there is effected what I term an autodeous weld between the facing plate of compressed powdered material and the backing plate, the parts being self bonded directly together without fusion of the high-melting-point metals and without the interposition of an extraneous low-melting-point metal for effecting a bond between the facing plate and the backing plate. The self-bonded direct union produced between the parts by such autodeous welding, because of the predominance of high-melting-point metal, such as copper or iron, in the facing plate, is characterized by a high temperature softening point and great toughness and strength so that the resulting composite body is adapted in operation to sustain successfully heavy stresses at relatively high temperatures.

With respect to each of the methods of welding which have been described it may be observed that if iron constitutes a large part of the high-melting-point metal of the powdered facing material, higher temperatures than those given above may be required to effect sintering and welding, particularly where carbon monoxide is used as reducing gas in the furnace.

In the welding operation, as carried out by either of the above described procedures, some warping of the steel disk may occur and in that event the welded disk assembly may be straightened by placing it between hardened steel plates and pressing the entire assembly in a hydraulic press. Following this operation the composite disks can be riveted to the hub 2.

The clutch disk 1, as shown in Figs. 1 and 2, in case renewal becomes necessary, must be renewed as an entirety. In Figs. 3, 4 and 5 my invention is applied to a composite metallic friction facing which can readily be applied to disk clutches, such as are now in common use, in which a friction facing is removably attached to the clutch disk by rivets or the like. The friction facing ring shown in Figs. 3 and 4 consists of a backing ring 4 of sheet steel or the like and a friction facing 5 formed of condensed powdered friction material of the character described above, the friction facings being formed, sintered and welded to the backing ring in accordance with either one of the above described procedures for forming the facings 1b and welding them to the clutch disk 1a. Alternatively, since the diameter and width of the backing ring and the friction facing are the same, the backing rings, together with the powdered facing material and suitable separators, may be introduced into the molding die and the friction facings compressed in contact with the backing rings so that the composite rings thus formed are ready, when removed from the die, to go directly to the welding furnace. If this last procedure is followed corrosion of the backing plate during heat treatment is best avoided by fabricating and welding the composite disk in a suitably air-conditioned space or by plating the backing disk with a protective metal coating, as described above in connection with Figs. 1 and 2.

After the composite clutch facing ring is removed from the welding furnace it is drilled with a series of countersunk rivet holes 6, 6. The rings thus prepared can be secured to a clutch disk 7 by rivets 8 as shown in Fig. 5. By countersinking the rivet holes into the steel backing plate, as shown in Fig. 5, the heads of the rivets are disposed so as not to project beyond the backing plate. Thus the friction facing can be used until it is worn down practically to the backing ring.

In Figs. 6 and 7 I have shown a modified form of composite friction clutch disk in which the disk 9 is fitted with composite friction facing rings 10, 10. These rings 10 are of the same general character and are made in the same manner as the composite rings shown in Figs. 3, 4 and 5. They preferably differ from the latter rings in that the backing sheet 10a is thinner than the backing sheet employed in Figs. 3, 4 and 5. Also I prefer to form the friction facings 10b, 10b with apertures 10c distributed around the ring at points where it is desired to attach the facing rings to the clutch disk. To effect such attachment the facing rings are assembled on the clutch disk 9 with the apertures 10c of one facing ring opposite those of the other facing ring and then by contacting the backing sheets with welding electrodes inserted through the apertures 10c, the two facing rings are effectively spot welded to the clutch disk. By providing a suitable number of spot welds distributed around the facing rings a complete disk assembly is produced that constitutes a practically integral unit.

In carrying out this form of construction, by using thin backing rings 10a the overall thickness and weight of the finished disk assembly may be made but slightly greater than the thickness and weight of the clutch disk shown in Figs. 1 and 2 and, in some instances, it may be preferable to employ this last described construction.

In Figs. 8 and 9 I have shown still another form of clutch disk construction which embodies my invention. In this construction a clutch disk 11 formed with perforations 11a has its outer perforate portion embedded in a continuous integral body 12 of friction facing material. This latter body comprises the plate-like facing sections 12a, 12a at either side of the disk 11, connecting portions 12b extending through the apertures in the clutch disk and a peripheral portion 12c.

In making this form of composite clutch disk I make use of a die or mold of the character shown in Fig. 10. As shown the die or mold comprises a base ring 13, an outer peripheral ring 14, cylindrical plates or blocks 15 and 16 which are yieldingly supported on a soft rubber ring 17, and an annular plunger or follower 18. In the use of this die, with the plate 16 and follower 18 removed, half of the charge of powdered friction material is introduced, the clutch disk 11, after having been treated, in the manner described in connection with the clutch disk 1a of Figs. 1 and 2, to thoroughly remove all grease and other foreign matter, is then placed upon the plate 15 and the plate or block 16 is placed in position. Then the remainder of the powdered charge of friction material is introduced and the annular plunger 18 is lowered upon it. With the die resting upon the bed of the press the plunger 18 is forced down to compress the powdered friction material to the form and size indicated in Fig. 9. If desired the press may be made to force the block 16 downward positively but at one half the speed of the plunger 18. During the compressing operation the rubber supporting ring 17 permits the lowering of the plates 15 and 16, as will readily be understood.

The disk assembly is then removed from the die and subjected to a sintering and welding treatment in accordance with my invention. To this end it is preferable either to fabricate the assembly and carry out the sintering and welding in a suitably air-conditioned space so as to prevent or sufficiently limit adsorption in the facing of the assembly of corroding moisture or gas, or to plate the ferrous backing disk with a metal coating to protect the backing disk during sintering and welding. By taking due precautions, as previously explained, to avoid oxidation of the metals of the structure and particularly of the ferrous metal of the clutch disk, a strong and effective autogenous weld of the friction material to the clutch disk is secured. In addition, the two friction facings of the disk are integrally joined through the perforations of the disk and around the periphery thereof so as to supplement the strength of the welded union between the friction facing material and the disk.

When the composite disk has been removed from the furnace it is preferably placed in a hydraulic press to size the friction material and, at the same time, straighten the disk in case of need.

In carrying out the last described form of my invention, the embedded strengthening sheet may take the form of strong woven screen or other foraminous forms.

In Figs. 11 and 12 I have shown my invention as embodied in a composite friction ring of the type used in multiple-plate clutches and brakes. This ring consists of a strong metal ring 19 of steel or the like to the faces of which friction facings 20, 20 are welded, the method of forming the friction facings and the method of welding them to the steel ring being in accordance with some one of the procedures described in connection with Figs. 1 to 10. The ring is formed with a peripheral series of notches 21, 21 designed to engage splines in the outer part of the clutch or brake of which the ring constitutes a part. In multiple-brake clutches and brakes alternate rings are attached in this way to an outer part and cooperate with another set of rings similar in construction except that their driving notches are formed on the inner edge of the ring, rather than on the outer edge thereof, to connect with the other part of the clutch or brake. In the manufacture of the rings the notches 21 can be stamped out after the friction facings 20, 20 have been welded to the ring 19.

In Figs. 13 and 14 I have illustrated a flexible metallic brake lining constructed in accordance with my invention. Here a flexible strip 22 of sheet metal is struck up at regular intervals to form lugs 22a which serve to locate friction buttons 23 formed of compressed powdered friction material of the character above referred to. These buttons are preferably formed in a suitable multiple cavity die by compressing powdered friction material therein, the bottom of the die being shaped to form depressions in the bottoms of the buttons to fit over the lugs of the flexible sheet 22. The buttons thus formed are sintered in the manner previously described.

The buttons 23 are strongly welded to the flexible strip 22 in accordance with my invention by some of the welding procedures described above. A number of the brake strips can conveniently be welded at the same time by stacking them up in the furnace with a suitable weight on top so that the buttons are firmly pressed against the flexible backing strips during the welding operation.

Any one of the alternative procedures described in connection with Figs. 1 and 2 may be employed in forming, sintering and welding the friction buttons 23 to the backing sheet. It will be understood that whichever procedure is employed precautions are taken to insure suitable non-oxidizing or reducing conditions during the formation of the welded bond, as described in connection with Figs. 1 and 2.

The flexible friction strips made in the manner described may advantageously be used as brake linings and the like. The strip 22 is preferably provided with perforations 22b to facilitate its attachment to a brake shoe or other carrier.

In composite elements where the facing members are relatively small, as in Figs. 13 and 14, it may be found feasible to sufficiently protect the ferrous metal backing sheet from oxidation by applying a suitable flux, such as borax or sal-ammoniac, to one of the surfaces to be welded together. As the temperature of the parts is raised during welding the flux softens and, by reason of the firm contact between the facing and backing members, tends to be squeezed from between the two members. Consequently while the ferrous metal of the backing member is protected from oxidation during at least a large part of the welding operation the flux will be largely if not entirely eliminated from the joint so as not to interfere with the forming of a satisfactory weld. Any metallic oxide that may form in the joint is dissolved in a flux such as borax and carried out with it.

In Figs. 15 and 16 I have shown a brake block made in accordance with the present invention. In this device a heavy strip 24 of steel or the like carries a relatively thin friction facing 25 of highly compressed powdered friction material of the character above described and of suitable composition for the purpose, the facing being autodeously welded to the steel strip by any of the procedures described in connection with Figs. 1 and 2. The block is provided with a suitable number of holes 26 for rivets to secure it to a brake shoe or other carrier. By countersinking the rivet holes 26 into the steel strip 24 and using rivets with flat heads, as in the construction of Fig. 5, the brake block can be used until the facing 25 is practically all worn away.

In the manufacture of the brake block shown in Figs. 15 and 16 the backing strip 24 and the facing strip 25 may be in flat form until after they have been welded together whereupon the unit may be bent on a suitable radius to the finished form shown in the drawings. I have found that the friction facing strip will withstand this bending operation if it is not made too thick.

Composite machine elements formed in accordance with my invention are characterized by the remarkable frictional characteristics of the compressed powdered friction material described, which characteristics may, of course, be varied by varying the composition of the facing material within the previously noted limits necessary to preserve the welding characteristics which have been described. At the same time the brittleness and weakness characteristic of frictional bodies formed of such powdered materials, as heretofore made, are entirely overcome by reason of the strong bond between the facing material and the backing member. By this method of uniting a facing material composed predominantly of powdered metal of high melting point and a backing member of ferrous metal such as steel, the bond between the two parts is so strong and effective that the distributive support thus afforded for the facing material gives the latter in large measure the strength of the backing member itself. In other words, the strength of the bond or weld is substantially greater than the strength of the facing material. Thus if tension is produced in the facing material, as by sharply bending the composite specimen with the facing outward, the facing will rupture before the bond will give way. Similarly, the strength of the bond, throughout its entire extent, tested in shear parallel to the welded surfaces is substantially stronger than the sintered facing material itself, as shown by rupture of the facing material rather than of the bond in a sharing test in which a specimen ⅛" thick in the direction of the shearing force to be applied has the shearing force applied parallel to the plane of the bond by a member engaging the side of the facing 3/32" or more away from the plane of the bond while the backing member of the specimen is firmly held. Furthermore, since the direct bond between the friction material consisting predominantly of high-melting-point metal and the backing member of steel or the like is adapted to withstand relatively high temperatures without softening, the composite unit is adapted to sustain relatively heavy stresses even when subjected to relatively high temperatures such as are encountered in clutches, brakes and even in some types of bearings. Also, since with the constructions illustrated the friction facing material can in use be worn down practically to the backing sheet or member, friction bodies made in accordance with my invention have exceedingly long life, particularly as the friction material of suitable composition is characterized by an exceedingly low rate of wear even when subjected to excessive slippage between the friction surfaces. Furthermore, with clutch or brake disk or ring constructions such as illustrated the thickness of the disk or rings can be made small, because of the slight wear and great strength, and thus the weight of the rotating parts can be correspondingly minimized. The excellent bond between the facing and backing members of my improved elements insures ample heat-dissipating capacity.

The present application constitutes in part a continuation of my prior application Serial No. 71,462, filed March 28, 1936, which, in turn, was a continuation in part of my still earlier application Serial No. 721,713, filed April 21, 1934, these prior applications having been abandoned. In the present application I make no claim to the method of welding in which corrosion of the ferrous metal backing member is prevented by electroplating upon it a film of protective metal, that specific method being the joint invention of this applicant and Charles B. Sawyer and constituting the subject of their separate application Serial No. 210,650, filed May 28, 1938. Furthermore, I make no claim herein to the furnaces disclosed in this application as they constitute the subject of my separate application Serial No. 282,344, filed July 1, 1939.

The high-melting-point metals suitable to constitute the predominant part of the compressed powder facings of my invention are, practically speaking, limited to copper and iron or mixtures of copper and iron. Accordingly, the expression "high-melting-point metal" as used in the following claims is to be construed to mean copper, or iron or mixtures of copper and iron.

It will be understood that my composite machine elements may take various forms for uses as friction members of clutches and brakes and as bearing members of various kinds and that the methods of making the composite elements can be varied widely, without departing from the invention as defined in the appended claims.

What I claim is:

1. The process of making a composite machine element which includes the steps of providing a backing member of ferrous metal, providing through the use of a controlled atmosphere a porous facing which is composed of compressed powdered material consisting at least predominantly of high-melting-point metal and which is substantially free from iron-corroding gases and vapors sorbed therein; holding the facing with a surface thereof in firm contact with a surface of the backing member of ferrous metal; and heating the facing and the backing member while so held to effect a direct weld between the ferrous metal of the backing member and the highmelting-point metal of the facing without fusing the latter metal.

2. A process as claimed in claim 1 in which the porous facing is provided substantially free from iron-corroding gases and vapors sorbed therein by compressing the powdered material in an atmosphere sufficiently free from iron-corroding gases and vapors to form the porous facing substantially free from such gases and vapors sorbed therein and maintaining such atmosphere around the facing until the facing is contacted with the backing in the welding operation.

3. A process as claimed in claim 1 in which the provision of the porous facing substantially free from iron-corroding gases and vapors sorbed therein includes heating the porous facing of compressed powdered material sufficiently to drive out of the facing substantially all iron-corroding gases and vapors sorbed therein before the facing is contacted with the backing member in the welding operation.

4. A process as claimed in claim 1 in which the porous facing is provided substantially free from iron-corroding gases and vapors sorbed therein by juxtaposing the facing and the backing mmeber, heating the facing and backing member sufficiently to drive out of the facing substantially all iron-corroding gases and vapors sorbed therein, and meanwhile providing between the juxtaposed facing and backing member a moving stratum of non-corrosive gas the dryness and velocity of which are great enough to prevent corrosion of the ferrous metal member by gases and vapors driven out of the pores of the facing.

5. A process as claimed in claim 1 in which the porous facing member is provided by compressing powdered material composed predominantly of high-melting-point metal and containing also lead, tin and graphite.

6. A process as claimed in claim 1 in which the porous facing member is provided by compressing powdered material composed predominantly of high-melting-point metal and containing also lead, tin, graphite and a friction material having a higher coefficient of friction than graphite.

7. A process as claimed in claim 1 in which the compressed material of the facing is converted from an unsintered to a sintered state during the heating to effect welding.

8. A composite machine element comprising in combination a ferrous metal backing member and a facing thereon consisting of a porous body of condensed and coherent powdered material composed at least predominantly of high-melting-point metal, the backing member and the facing being united substantially throughout their mutually contacting surfaces by a direct weld substantially stronger than the facing body and formed by providing the facing, through the use of a controlled atmosphere, substantially free from iron-corroding gases and vapors sorbed therein, holding the facing with a surface thereof in firm contact with a surface of the backing member, and heating the facing and backing member while so held to effect said direct weld between the ferrous metal of the backing member and the high-melting-point metal of the facing without fusing the latter metal.

9. A composite machine element comprising in combination a ferrous metal backing member and a facing thereon consisting of a porous body of condensed and coherent powdered material composed at least predominantly of high-melting-point metal, the backing member and the facing being united substantially throughout their mutually contacting surfaces by a direct weld substantially stronger in shear parallel to the welded surfaces than the facing body and formed by providing the facing, through the use of a controlled atmosphere, substantially free from iron-corroding gases and vapors sorbed therein, holding the facing with a surface thereof in firm contact with a surface of the backing member, and heating the facing and backing member while so held to effect said direct weld between the ferrous metal of the backing member and the high-melting-point metal of the facing without fusing the latter metal.

10. A composite machine element comprising in combination a ferrous metal backing member and a facing thereon consisting of a porous body of condensed and coherent powdered material composed at least predominantly of high-melting-point metal, the backing member and the facing being united substantially throughout their mutually contacting surfaces by a direct weld characterized by a substantially distinct line of demarcation between the backing member and the facing and by substantially greater strength than the facing body and formed by providing the facing, through the use of a controlled atmosphere, substantially free from iron-corroding gases and vapors sorbed therein, holding the facing with a surface thereof in firm contact with a surface of the backing member, and heating the facing and backing member while so held to effect said direct weld between the ferrous metal of the backing member and the high-melting-point metal of the facing without fusing the latter metal.

11. A composite machine element comprising in combination a ferrous metal backing member and a facing thereon consisting of a porous body of condensed and coherent powdered material composed at least predominantly of high-melting-point metal, the backing member and the facing being united substantially throughout their mutually contacting surfaces by a direct weld characterized by a substantially distinct line of demarcation between the backing member and the facing and by substantially greater strength in shear parallel to the welded surfaces than the facing body and formed by providing the facing, through the use of a controlled atmosphere, substantially free from iron-corroding gases and vapors sorbed therein, holding the facing with a surface thereof in firm contact with a surface of the backing member, and heating the facing and backing member while so held to effect said direct weld between the ferrous metal of the backing member and the high-melting-point metal of the facing without fusing the latter metal.

SAMUEL K. WELLMAN.